INVENTORS
MAX F. BECHTOLD
FRANK SHUMATE FAWCETT

BY James H. Ryan

ATTORNEY

US Patent Office 3,429,845
Patented Feb. 25, 1969

3,429,845
COMPOSITIONS COMPRISING POLYSILICIC ACID AND COPOLYMERS OF FLUORINATED MONOMERS WITH OMEGA-HYDROXYALKYL VINYL ETHERS
Max F. Bechtold, Kennett Square, Pa., and Frank Shumate Fawcett, Wilmington, Del., assignors to E. I. du Pont de Nemours and Company, Wilmington, Del., a corporation of Delaware
Filed June 15, 1965, Ser. No. 464,063
U.S. Cl. 260—29.6         32 Claims
Int. Cl. C08f 29/26, 45/04; C09g 3/78

ABSTRACT OF THE DISCLOSURE

Described and claimed are compositions comprising polysilicic acid and copolymers of fluorinated monomers with omega-hydroxyaliphatic vinyl ethers, e.g., copolymers of tetrafluoroethylene and 4-hydroxybutyl vinyl ether, useful as scratch-resistant coatings for plastics, e.g., poly(methyl methacrylate).

FIELD OF THE INVENTION

Figure 1:
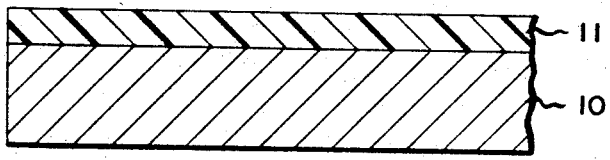

This invention relates to polymeric or complex compositions of matter, especially transparent compositions, having superior coating properties such as resistance to abrasion and adhesion when applied to solid substrates, to solutions from which coatings can be laid down, and to the application of coatings from the solutions.

BACKGROUND OF THE INVENTION

Increasingly severe demands are being made by architects and designers for various transparent enclosures, e.g., in autos and aircraft, and for windows, e.g., in schools, where breakage creates unsafe and undesirable conditions. In many applications, there is need for a transparent material that is capable of easy fabrication into various shapes and which also exhibits superior properties of resistance to shattering, abrasion, cleaning compounds, and the deleterious effect of weathering. Although glass provides many of these properties, for some uses it has disadvantages.

Polymers of organic materials have many properties that make them desirable for applications such as those mentioned above. Organic polymers, for example, are generally less dense than glass, have excellent resistance to shattering, and are easily formed or fabricated and sealed to supports. Plastics such as poly(methyl methacrylate), therefore, have found applications particularly as walls for enclosures, e.g., for aircraft. In general, however, the surface hardness of organic plastics is considerably inferior to that of inorganic glasses. Considerable effort has thus been expended in the preparations of scratch-resistant coatings. It has been shown in U.S. Patents 2,404,357, 2,404,426 and 2,440,711 that silica-containing solutions, when applied in carefully detailed procedures, can improve the surface characteristics of the substrate polymer. These materials have not achieved commercial importance since the techniques taught have several disadvantages, e.g., they are difficult and usually expensive to carry out if they are to provide resistant coatings of high quality. For example, heating a coating while it is pressed against a polished rigid surface to give a smooth surface and using a plurality of different coatings to obtain useful thickness and hardness represent complicated and expensive procedures.

To obtain proper balance of weather-, water-, and scratch-resistance, optical perfection, thermal stability, etc., in the coated organic polymer along with ease and rapidity of application makes demands heretofore unanswered by coating and polymer technology. The coating must adhere strongly to the polymer substrate. It should be inert to the effects of weather, solvents, stains, soaps, salts, tar, etc. It should have a glass-like appearance and, preferably, a low index of refraction to provide a sheet of high light transmission and low reflectivity. It should also resist collection of dust by static charges, fogging or icing and have low surface friction. In addition, the coating should not seriously reduce the post-forming characteristics of the substrate, e.g., as by bending a heated polymer sheet.

It is an object of this invention, therefore, to provide solid, polymeric or complex materials suitable as protective coatings for solid substrates.

Another object is provision of complex coatings for solid substrates, which coatings may carry pigments.

A particular object is to provide improved transparent polymeric coatings for solid substrates, particularly transparent substrates.

Another object is to provide articles coated with the polymeric or complex coatings of the invention, particularly transparent articles.

A further object is provision of solutions from which the coatings of the invention can be applied.

A still further object is provision of a simple and economical proces for preparing the complexes and coatings of the invention.

DESCRIPTION OF THE INVENTION

Figure 2:
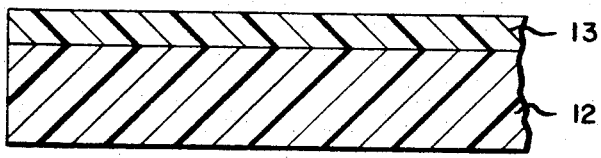

In accordance with the above-mentioned, and still other, objects of the invention there is now provided a novel transparent copolymeric or complex composition of matter suitable for use as an improved coating composition. Details will be evident from the remainder of the specification and from the drawings (not in scale) in which:

FIG. 1 shows the coating of the invention, made from the coating-forming composition thereof, applied to any solid substrate. In FIG. 1, the numeral 10 refers to the substrate, which as shown my be a metal, e.g., aluminum, and numeral 11 refers to a coating of any of the compositions of the invention laid down upon the substrate; and FIG. 2 shows a preferred embodiment of the invention in which the numeral 12 refers to a transparent plastic, e.g., poly(methyl methacrylate), employed as a solid substrate carrying a preferred transparent polymeric or complex coating of the invention designated by numeral 13, e.g., one based on a stable complex of silica and a tetrafluoroethylene/4-hydroxybutyl vinyl ether copolymer.

In FIG. 1, the general figure, the coating 11 is based upon a new and improved polymeric composition which comprises polysilicic acid (varying from 10–90 parts by weight calculated as $SiO_2$) and a preformed organic copolymer (90–10 parts) which contains a plurality of fluorine atoms and a plurality of primary alcoholic hydroxyl groups. The ratio of alcoholic hydroxyl to fluorine varies from 1/1 to 1/22, generally 1/2 to 1/6, with the ratio of fluorine to carbon of the polymer being within the range of from 1/17 to 1.93/1, generally from 1/4 to 1/1. The fluorine-containing organic polymer has a degree of polymerization of at least 100, preferably more than 500, and has primary hydroxyls, i.e., hydroxyls attached to a carbon bearing two hydrogens, said carbon being the last (omega) carbon of a chain pendent to the main polymer chain. Preferred polymers have a plurality of difluoromethylene units and particularly useful are those having tetrafluoroethylene units. Furthermore, copolymers that are preferred are those of polymerizable fluoroolefins with ω-hydroxyvinyl compounds of 3–13 chain atoms and particularly of aliphatic vinyl ethers, especially of the formula $CH_2=CHO(CH_2)_nOH$ where $n$ is 2-8. In the preferred compositions, the weight ratio of polysilicic acid (as $SiO_2$) to fluorine and hydroxyl-containing organic polymer is 20-50% to 80-50%. A particularly preferred weight-ratio range, especially for coating thermoplastic substrates, is 25-40/75-60 polysilicic acid/organic polymer.

The novel coatings, and hence solid coating composition-forming compositions, made from the complex of the invention are prepared by contacting a substrate to be coated with solutions which themselves constitute an embodiment of the invention. These solutions usually contain a solvent consisting of a lower alkanol, e.g., ethanol, containing some water, e.g., between 1 and 10 percent by weight, and a total of active solids, i.e., coating-forming materials or precursors of the ultimate coatings, of between 2 and 25 percent by weight, preferably 5-15%. Process or other adjuvants such as acetic acid, "Cellosolve,"® silicones, etc., may also be present, as will be understood by those skilled in the art, but they are substantially absent in the ultimate coating. Pigments, dyes, etc., can be added if desired.

The coating process of the present invention is simplicity itself, particularly when compared with processes of the prior art. It is merely necessary to contact an article to be coated with a coating solution as by dipping, flowing, spraying, or wiping and to dry the resulting coated article. Repeated contact, or dipping, can be employed if desired to increase the thickness of the coating laid down.

Removal of volatile materials is an irreversible process and results in the production of a uniform and clear product or coating. Air-drying at room or slightly elevated temperatures can easily be employed to remove solvent but heating at 90-180° C. for periods of 10 minutes to an hour or more generally gives superior products.

It will be readily understood that stripping a deposited coating of the complex of the invention from one of the few substrates to which it does not adhere tenaciously, e.g., untreated "Teflon,"® or dissolving away a metal substrate as by an acid produces self-supporting films. Simple evaporation of solvent from a solution of the polymer-forming compositions of the invention results in pre-shaped bulk articles formed therefrom.

The solutions from which the coatings are laid down are themselves readily prepared by simple admixture of the ingredients. Polysilicic acid solutions are made up as by hydrolyzing an alkyl silicate in an alcohol by water, preferably containing acid, and mixed with a copolymer of tetrafluoroethylene and a primary hydroxyl-containing compound to achieve an "active solids," i.e., polymer- or complex-forming, content of 2 to 25%. Selected process adjuvants are added as desired. The process of the invention is then carried out as described above.

The final product formed in this invention has

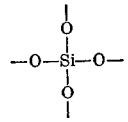

units wherein at least one oxygen is attached to another silicon and with 0 to 2 (average less than 1) other oxygens attached to the carbon of a hydroxy aliphatic fluorine-containing polymer via condensation, and, if not all satisfied by such bonds, to hydrogen. Thus, the ultimate hard structure is thought to consist of two coextensive compatible transparent structures, one of a tough linear polymer chemically bonded at several points to a hard, three-dimensional

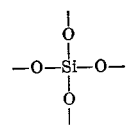

network. In other words, the structure can be pictured as a macromolecular (nonparticulate) reinforcement of the essentially linear organic polymer or as a plasticization of a hard polyfunctional condensation polymer (polysilicic acid) with a tough linear organic polymer. It may thus be regarded as an interlocking copolymer or complex of silica and the preformed copolymer. The complexes are transparent but may carry entrapped pigment or other filler. Small amounts of solid adjuvant may on occasion also be entrapped or occluded from the baths but these affect the interlocking complex in no substantial way.

There are several important properties in which preferred embodiments of the invention, that is, organic polymers coated with the compositions or complexes of this invention, i.e., polysilicic acid/copolymer of a fluoroolefin with a primary hydroxyl-containing vinyl compound, excel coatings described in the art. These include superior adhesion, thermal stability, sunlight resistance, scratch resistance and formability. The ratios of scratch resistance to formability and to $SiO_2$ concentration are especially higher than those found with polymers such as polyvinyl alcohol and derivatives, including the partial acetals or acetates. They also have less tendency to water-spot and soften upon long exposure to mineral-bearing air, such as alternate salt spray and sunlight exposure, than do coatings of the copending application Ser. No. 464,064, filed herewith. The new compositions are readily applied by conventional methods from a solution and upon evaporation of solvent give coatings of exceptional scratch resistance, optical perfection, toughness and freedom from crazing in thick layers.

The relative value of scratch-resistant coatings can be assessed by physical observations. In the description that follows the physical characteristics of the coatings were determined by conventional methods, e.g., the coating thickness can be measured by interferometry [see Bechtold, J. Opt. Soc. 37, 873–8 (1947)]. Resistance to exposure was observed by the use of the carbon arc Weather-Ometer (ASTM E42–57) and outdoor testing. Scratch resistance can be quantitatively determined by the Taber abraser [American Standards Association Test Z26.1–1950] and the falling carborundum test [ASTM D673–44]. Haze and luminous transmittance are determined by ASTM D1003–61. Other tests also useful include application of soap (e.g., mark with soap, keep at 100% R.H. for 16–64 hours) and soap solutions, washing, wiping, rubbing with steel wool, etc.

The following is a description of a wiping tester that has been found especially useful in determination of the superior scratch-resistant properties of the products of this invention: To a 12" long crank-arm attached one inch off-center to a wheel driven by a motor at a speed of 60–72 r.p.m. is further attached at the other end a half-cylinder of about 2" diameter and length. To the curved bottom is attached generally about eight thicknesses of cheesecloth, the cloth saturated with whiting, abrasive or cleanser, either dry or wet with the weight being generally about 100 g. on the pad. Comparisons are obtained after a cycle of generally 600 oscillations. Panels of uncoated poly(methyl methacrylate) are severely scratched and rated 0% while coated panels showing no scratches are rated 100%. Intermediate ratings are obtained by comparisons of uncoated panels abraded at less than 600 oscillations. For example, a coated panel scratched as much at 600 oscillations as a noncoated panel at 60 oscillations is rated 90% while a panel abraded as much at 600 oscillations as a noncoated panel is at 450 oscillations is rated 25%.

EMBODIMENTS OF THE INVENTION

The following examples illustrate specific embodiments of this invention. In these examples, parts, ratios and percentages are by weight unless otherwise noted. A preferred embodiment of the invention is represented by Example XIV.

Example I

A polysilicic acid solution was prepared by mixing 200 g. of ethyl silicate, 139.6 g. of absolute ethanol, and 45 g. of 0.1 N hydrochloric acid at room temperature.

A solution of 5 g. of a copolymer of tetrafluoroethylene and 2-hydroxyethyl vinyl ether of molar ratio of 1/1 in 95 g. of 95% ethanol was obtained by inserting the ingredients in a glass container and rolling at a slow speed until homogenous.

The above solutions were mixed to obtain the following:

A. 30 g. of polysilicic acid solution (15% $SiO_2$, i.e., 4.5 g. of $SiO_2$), 90 g. of copolymer solution (containing 4.5 g. of copolymer),
B. To the above solution A was added about 10 g. of glacial acetic acid to form a solution,
C. To the solution B above was added an additional 10 g. of acetic acid,
D. The preceding solution C was mixed with 5 g. of butyl "Cellosolve"®.

Panels of cast poly(methyl methacrylate) sheeting were dipped in each solution for 2 minutes, withdrawn vertically at a rate of 12″/min., then baked ½ hour at 150° C. The coated panels generally had good scratch resistance. Panels having a coating of solution D were superior in clarity. Addition of acetic acid improved adhesion of A to the substrate. Thicker coatings (about 1.22 $\mu$) were obtained by increasing the withdrawal rate with solution D.

Example II

A solution was prepared with 10 g. of the tetrafluoroethylene/2-hydroxyethyl vinyl ether copolymer (as in Example I) in 40 g. of ethanol and 2.5 cc. of 1% hydrogen chloride in methanol and mixed with a solution containing 36.8 g. of 15% silica (as in Example I), 3.8 g. of acetic acid, 5 g. of butyl "Cellosolve"® and 0.064 g. of an organosilicone (Union Carbide Corp. L-530; a block copolymer of polyoxyethylene/polyoxypropylene with methyl siloxane).

Coatings on poly(methyl methacrylate) were obtained at a withdrawal rate of 8″/min. and with baking as per Example I. The coatings were about 2.8–3.0$\mu$ thick, scratch-resistant (based on wet whiting gave a value of 100%, which after one hour in water at 60° C. decreased to 93%), and were only slightly affected by abrading with steel wool after 64 hours in water at room temperature. No optical deterioration occurred in accelerated weathering (ASTM E42–57) for 1734 hours and for over eight months outdoors at a 45° angle facing south in Delaware.

Example III

A solution was prepared which contained the following:

71.0 g. of 11.27% tetrafluoroethylene/2-hydroxyethyl vinyl ether/2-methoxyethyl vinyl ether copolymer in molar ratio of 50/33/17 in t-butyl alcohol
5.5 g. of t-butyl alcohol
0.5 g. of 2% aq. HCl in t-butyl alcohol
35.6 g. of 15% $SiO_2$ (see Example I)
35.0 g. of acetic acid
0.128 g. of organosilicone (see Example II)

Panels of poly(methyl methacrylate) coated with the solution (withdrawal rate of 12″/min. followed by baking at 170° for ½ hour) were about 2.60–2.65$\mu$ thick and were scratch resistant. After accelerated weathering for 1429 hours, only a few places indicated a deficiency in adhesion.

Example IV

Six coating solutions were prepared containing a ratio of about 30 $SiO_2$/70 tetrafluoroethylene/4-hydroxybutyl vinyl ether copolymer of ratio of about 1 to 1 on a molar basis.

The polysilicic acid ($SiO_2$) content varied from about 2.57 to 3.37%, the copolymer from 5.88 to 7.99%, water from 3.11 to 8.03%, ethanol from 11.62 to 71.20%, other alcohols (methyl, n-butyl, t-butyl or isopropyl) from 0 to 70.67%, acetic acid from 0 to 12.05% and organosilicones which are block copolymers of one or more lower alkylene oxides with dimethyl siloxane (Union Carbide Corp. L-520, L-522) from 0.02 to about 0.08%. The solutions were also used after ageing up to 51 days at which time they had undergone relatively minor changes.

Coatings on poly(methyl methacrylate) sheets at withdrawal rates of 3 to 12 in./min. after baking gave thicknesses of about 2.6 to 4.2$\mu$, some of which were relatively free from silkiness (ridging, uneven flow). The panels were scratch resistant (Taber test) and had resistance to soap.

Example V

A series of coating solutions were prepared containing polysilicic acid/copolymer as in Example IV, water, ethyl alcohol, t-butyl alcohol (optionally up to 11.5% isopropyl alcohol), acetic acid and organo-silicone. The major variation in the series was in polysilicic acid/polymer ratio. The following table shows the properties of the coated polymer obtained by the use of the solutions:

| $SiO_2$ (percent) | Copolymer (percent) | Scratch resistance with wet foaming cleanser with bleach | Scratch resistance after exposure to soap and abrasion with steel wool |
|---|---|---|---|
| 0 | 100 | 40 | Poor. |
| 6.05 | 93.95 | 10 | Do. |
| 12.65 | 87.35 | 70 | Fair. |
| 17.98 | 82.02 | 85 | Good. |
| 24 | 76 | 90 | Good-excellent. |
| 30 | 70 | 96 | Excellent. |
| 36 | 64 | 98 | Fair-excellent. |
| 42 | 58 | 98 | (Poor adhesion.) |
| 48 | 52 | 96 | Do. |

Example VI

A. A solution was prepared containing 20 g. of polysilicic acid (15% $SiO_2$), 20 g. of acetic acid, 50 g. of a solution in t-butyl alcohol of 12.78% tetrafluoroethylene/3-hydroxypropyl vinyl ether copolymer of molar ratio of about 1/1. The ratio of $SiO_2$ to polymer was 32/68.

B. A second solution consisted of 88.5 g. of solution A with 10 g. of 80/20 t-butyl alcohol/acetic acid and 0.046 g. of organosilicone of Example IV (Union Carbide Corp. L-520) as spreading aid.

C. To 93 g. of solution B was added 16.8 g. of the solution of copolymer A, 8 g. of 80/20 t-butyl alcohol/acetic acid and 0.023 g. of the organosilicone. The ratio of $SiO_2$/copolymer was 26/74.

D. To 116.5 g. of solution C was added 10 g. of 80/20 t-butyl alcohol/acetic acid and 0.023 g. of the organosilicone.

Poly(methyl methacrylate) panels coated with the above solutions using a withdrawal rate of 12″/min. and baking ½ hour at 170° C. all had excellent scratch resistance to steel wool. Coating A (without added leveling agent) gave a good coating which exhibited a silky appearance. Coatings of C and D were optically superior but tended to give a trace of crazing upon heat treatment. Coatings with B were excellent optically and resistant to soap, hot water and scratches. The coating thickness varied from 3.62–3.95$\mu$.

Example VII

Solutions were prepared as follows:
A. A mixture of 25 g. of 15% silica solution (see Example I) and 75 g. of t-butyl alcohol containing 11 g. of a copolymer of tetrafluoroethylene/4-hydroxybutyl vinyl ether/2-hydroxyethyl vinyl ether in 2/1/1 molar ratio. The SiO₂/polymer ratio was 25.5/74.5.

B. 98 g. of solution A with 0.046 g. of the organo-silicone leveling agent (Example II).

C. 96 g. of solution B and 10 g. of acetic acid.

D. 104 g. of solution C and 0.046 g. of the organosilicone as per B.

E. 103 g. of solution D, 5 g. of acetic acid and 5 g. of t-butyl alcohol.

F. 110 g. of solution E, 5 g. of acetic acid and 5 g. of t-butyl alcohol.

G. 113 g. of solution F, 5 g. of acetic acid and 5 g. of t-butyl alcohol.

Panels of poly(methyl methacrylate) were coated with the above solutions as in Example I at a withdrawal rate of 12″/min. followed by ½ hour at 170° C. All the coatings had good to excellent scratch resistance. Coatings from E, F, and G were thick (4.5μ) and substantially completely free of surface roughness.

Example VIII

A methyl methacrylate casting syrup was prepared by combining 95 parts of a methyl methacrylate monomer/polymer (80/20) mixture with 5 parts of methyl methacrylate monomer containing 0.05 part of benzoyl peroxide. The resulting syrup was subjected to a vacuum treatment to remove bubbles and then poured into a cell assembled from two glass plates separated by a ⅛″ plasticized polyvinyl chloride gasket. The glass plates were held together with heavy spring clamps. The filled cell was heated at 65° C. for 15 hours and at 100° C. for 2 hours, then cooled to facilitate stripping of the glass and gasket from the poly(methyl methacrylate) sheet. (Details of methyl methacrylate sheet casting are described on pages 197–203 of Schildknecht, "Vinyl and Related Polymers," John Wiley & Sons, New York, 1952.)

The freshly prepared sheet without further treatment was dipped for 2 minutes in a coating solution containing 40 parts of polysilicic acid solution (from 1000 parts of ethyl silicate, 47 parts of ethanol and 45 parts of 0.1 N HCl), 14 parts of tetrafluoroethylene/4-hydroxybutyl vinyl ether (1/1) copolymer, 127.4 parts of t-butyl alcohol, 18.6 parts of n-butyl alcohol, 50 parts of glacial acetic acid, and 0.15 part of the organosilicone of Example VI. The sheet was withdrawn at 12″/min., held in air at 40% R.H. for 3 minutes, and then baked for 30 minutes at 170° C. The coated sheet was clear and uncrazed after this treatment. The coating had excellent adhesion to the poly(methyl methacrylate) substrate and showed good scratch resistance to No. 0000 steel wool.

This example shows how to avoid unnecessary handling, cleaning, and trimming of poly(methyl methacrylate) sheets coated with silica-tetrafluoroethylene/hydroxyalkyl vinyl ether copolymer compositions, i.e., by integrating the coating operation with the sheet-casting operation.

Example IX

A coating solution containing polysilicic acid and tetrafluoroethylene/4-hydroxybutyl vinyl ether (1/1) copolymer in the ratio 70/30 was prepared by mixing 148 parts of 15% polysilicic acid (prepared by treating 121 parts of tetraethyl orthosilicate with 27 parts of 0.1 normal HCl) with 126 parts of an 11.9% solution of the copolymer in n-propyl alcohol. This clear viscous solution was coated onto poly(methyl methacrylate) sheet using a pad of fine mesh nylon cloth as the applicator. The coating was then allowed to dry at room temperature. Although slight striations were present in the coating immediately after application, they did not remain on standing. After curing for two days at room temperature, the coating had excellent optical properties and excellent scratch resistance to No. 0000 steel wool.

Example X

A coating solution was prepared by first making polysilicic acid as follows:

|   | Parts |
|---|---|
| Tetraethyl orthosilicate | 100 |
| Absolute ethanol | 69.5 |
| 0.1 N HCl | 22.5 |
|   | 2–0–1 |

These materials were mixed, the exothermic reaction was allowed to subside, and the solution was then aged for at least 24 hours before use.

A total of 13.33 parts of the above solution was mixed with 17.23 parts of tetrafluoroethylene/4-hydroxybutyl vinyl ether copolymer (1:1 molar ratio) as an 11.6% (by weight) solution in t-butyl alcohol, 50.25 parts of 95% alcohol, 19.19 parts of n-butyl alcohol, and 0.032 part of the organosilicone of Example VI.

This coating solution was applied by conventional spray application as a topcoat of final thickness of about 3 microns over a typical pigmented acrylic automotive finish on auto-body steel. After a five-minute air flash and a 30-minute bake at 135° C. (275° F.), the resulting topcoat imparted greatly improved mar-, scratch- and solvent-resistance to the automotive finish, and restored gloss to a previously chalked finish.

Freshly cleaned samples of iron, steel, brass and copper were partially immersed in a similar coating solution, allowed to soak 2 min., withdrawn at a rate of 9″/min., air flashed 5 min. and baked 30 min. at 105–170° C. The coating thickness on these samples was about 1.5–3.5μ. The partially coated samples were exposed for 1.5 months in Delaware, 45° south. At the end of this period, the coated steel, brass, iron, and copper samples showed greatly improved tarnish and corrosion resistance over the uncoated sections of the samples.

Samples of poly(methyl methacrylate) sheet were undercoated and vacuum metallized in the conventional manner. The vacuum metallized plastic was then coated by dipping into a coating solution, prepared as described above but containing 70/30 silica/copolymer, withdrawing immediately, and allowing the coating to air dry. The coating was found to impart a high degree of scratch resistance to the vacuum metallized surface.

Example XI

A pigmented coating was prepared in the following manner.

A charge was made up consisting of:

|   | Parts |
|---|---|
| Tetrafluoroethylene/2-hydroxyethyl vinyl ether copolymer (1/1 molar ratio) solution (as a 10% by weight solution in t-butyl alcohol) | 26.67 |
| Titanium dioxide pigment | 2.0 |
|   | 2–1–1 |

The above charge was ball-milled with glass beads for a period of about four days. To the resulting dispersion was then added 7.6 parts of polysilicic acid solution of the preceding example, 0.72 part of butyl "Cellosolve,"® and 0.032 part of the organosilicone of Example VI. One volume of the resulting paint was thinned for spray application with one volume of a 2.64/1 (by weight) blend of ethanol with n-butyl alcohol.

Spray application of this paint to a piece of poly(methyl methacrylate) sheet, followed by a 5 min. air flash and a bake of 30 minutes at 150° C. gave a white coating of excellent toughness, hardness, scratch resistance, and adhesion.

Example XII

To 20 g. of a polysilicic acid solution (15% SiO₂) in ethyl alcohol was added 8 g. of n-butyl alcohol and 71.65 g. of a t-butyl alcohol solution containing 10.83% of tetrafluoroethylene/5-hydroxypentyl vinyl ether copolymer of 1/1 mol ratio, an additional 8 g. of n-butyl alcohol, 0.069 g. of organosilicone as described in Example VI, 22 g. of methanol, 6 g. of water and 11 g. of acetic acid. The solution had a ratio of $SiO_2$/polymer of 27.9/72.1. After standing two days, the solution was used on poly(methyl methacrylate) to give clear, strongly adherent and highly scratch-resistant coatings of high optical quality, using a 2-minute soak in the coating solution followed by withdrawal at a rate of 14″/min. and baking ½ hour at 170° C.

Example XIII

A solution was prepared containing the following:

30 g. of a polysilicic acid of 15% $SiO_2$ (by adding to 100 parts of ethyl silicate, 47 parts of ethanol and 45 parts of 0.1 N HCl),
84.55 g. of a t-butyl alcohol solution having 13.58% tetrafluoroethylene/6-hydroxyhexyl vinyl ether copolymer (1/1 molar ratio),
20 g. of acetic acid,
0.069 g. of organosilicone as described in Example VI.

A poly(methyl methacrylate) panel was coated as described in the preceding example to give a coating that had excellent adhesion, scratch resistance, resistance to strong soap and excellent optics. There was only very slight surface irregularity, a surprising fact considering the thickness of the coating (about 4.5μ).

Example XIV

A precipitated washed and dried copolymer of tetrafluoroethylene/4-hydroxybutyl vinyl ether of about 1/1 molar ratio was dissolved in t-butyl alcohol to a solids content of 9.97%. Using this polymer, a bath of polysilicic acid/copolymer (30 $SiO_2$/70 tetrafluoroethylene with 4-hydroxybutyl vinyl ether) solution was prepared and used to dip-coat 142 poly(methyl methacrylate) sheets over a four-day period. 135 of these panels were 2′ x 3′ sheets partially coated on both sides and 18 were smaller panels formed into curved objects after baking. The total surface coated was 1075 sq. ft. Withdrawal rate from the bath was about 12″/min. Subsequent to coating, the sheets were baked ½ hour at 170° C. in an air circulating oven. The coating operation was carried out at ambient temperature and relative humidity of ca. 75° F. and 35% respectively.

The coating bath initially employed had the following composition:

982 g. of hydrolyzed tetraethyl silicate made by mixing 100 parts of ethyl silicate with 47 parts of ethanol and 45 parts of 0.1 N hydrochloric acid 3 days before use
3450 g. of the above-described solution of tetrafluoroethylene/4-hydroxybutyl vinyl ether in t-butyl alcohol
451 g. of n-butyl alcohol
1206 g. of glacial acetic acid
3.0 g. of organosilicone (Union Carbide and Carbon "L-520," block copolymer of lower alkylene oxides with dimethyl siloxane)

6092.0 g.

During the run, additional portions of the original formulation were added at intervals ranging from 12 to 20 hours to give a total bath content of 12.18 kg., of which 7.60 kg. was used in coating the panels.

The thickness of the coatings ranged from 3.5 to 4 microns. Coated poly(methyl methacrylate) sheets prepared substantially as above had high optical quality which was maintained satisfactorily for 2300 hours in a carbon arc Weather-Ometer (for 102 min. dry followed by 18 min. water spray onto the dry surfaces, which had attained a temperature of 63° C.); whereas, coatings based on a 60% silica/40% polyvinyl propanol solution fail before 350 hours. The coatings are superior in this respect to coatings prepared with polysilicic acid and hydrolyzed copolymer of tetrafluoroethylene with vinyl acetate (44/56) which do not have primary hydroxyls. The scratch resistance rating with the wiping tester with wet whiting was 100%, and with foaming scouring powder was 99%. The ratings after cold water exposure for 64 hours and after hot (60° C.) water immersion for 2 hours followed by wiping with the scouring powder were 95–99%.

Post-formability of the coatings on ⅛″ poly(methyl methacrylate) sheets is demonstrated by reheating the panels to 140–150° C. for about 10–15 minutes followed by draping in a curved form. A radius of curvature of about 2¾″ is obtained without optical defect. This corresponds to an apparent tensile and compressive deformation of about 2.3%.

Example XV

A series of solutions of polysilicic acid/copolymer of chlorotrifluoroethylene with 4-hydroxybutyl vinyl ether was used to coat poly(methyl methacrylate) sheets after two minutes in the bath and a withdrawal rate of 12″/min. followed by air drying for five minutes and heating for ½ hour at 170° C. as follows:

A. 42.7 g. of polysilicic acid solution (15% $SiO_2$) in ethanol, 100 g. of 14.11% copolymer (chlorotrifluoroethylene/4-hydroxybutyl vinyl ether in t-butyl alcohol (31.2 $SiO_2$/68.8 copolymer). Coatings were scratch resistant.

B. To 129 g. of solution A was added 17.58 g. of copolymer solution and 30 g. of n-butyl alcohol (27.5 $SiO_2$/72.5 copolymer). Clear, adherent, scratch-resistant coatings were obtained at a withdrawal rate of 6″/min.

C. To 171 g. of solution B was added 20 g. of n-butyl alcohol, 40 g. of acetic acid and 0.115 g. of the organosilicone of Example VI. Coatings obtained were optically clear (nonsilky) and had excellent adhesion and scratch resistance.

Example XVI

A solution was prepared containing the following:

24.55 g. of a polysilicic acid solution having 15% $SiO_2$ (see Example XIII)
70.0 g. of t-butyl alcohol solution of a copolymer of 12.3% tetrafluoroethylene/4-hydroxybutyl vinyl ether/3-hydroxypropyl vinyl ether (1/0.5/0.5 molar ratio)
11.28 g. of n-butyl alcohol
0.069 g. of organosilicone of Example VI The clear solution (having 30/70 ratio of $SiO_2$/organic polymer) was used as in the preceding example to coat poly(methyl methacrylate) sheets to give a thick (5.37μ) optically clear, soap- and scratch-resistant coating.

Addition of acetic acid and silicic acid gave compositions of $SiO_2$/polymer ratios of 34.4/65.6, 38.6/71.4 and 46.9/53.1. These coatings generally had increased scratch resistance but decreased soap resistance as $SiO_2$ concentration increased.

Example XVII

A solution was prepared containing the following:

17.2 g. of 15% $SiO_2$ polysilicic acid (see Example XIII) aged 4 days
100 g. of 11.88% solution of copolymer of tetrafluoroethylene/6-hydroxyhexyl vinyl ether (about 1/1 molar ratio) in methanol
15 g. of n-butyl alcohol
15 g. of acetic acid
0.07 g. of organosilicone described in Example VI The solution had a $SiO_2$/polymer ratio of 88/12. Poly(methyl methacrylate) sheets were placed in the solution, withdrawn and heated as described in Example XV. Clear and hard coatings of 1.89μ thickness were obtained.

Example XVIII

A solution containing the following:

25 g. of polysilicic acid (15% $SiO_2$) aged 2 days (see Example XIII)
87.7 g. of 9.98% solution in t-butyl alcohol of copolymer obtained by polymerization in 1/1/2 molar ratio of tetrafluoroethylene/chlorotrifluoroethylene/4-hydroxybutyl vinyl ether
36 g. of n-butyl alcohol
37.5 g. of acetic acid
0.07 g. of organosilicone described in Example VI was used in coating as in the preceding example to give clear scratch-resistant coatings. The silica/polymer ratio of the coating was 30/70.

Example XIX

A solution of the following:

26.2 g. of polysilicic acid (15% $SiO_2$ as described in Example XIII) aged 3 days
100 g. of 9.37% solution in t-butyl alcohol of copolymer obtained by polymerization in 22/14/3 weight proportions of tetrafluoroethylene/4-hydroxybutyl vinyl ether/octadecyl vinyl ether
26 g. of n-butyl alcohol
27.5 g. of acetic acid
0.07 g. of organosilicone described in Example VI having a silica/polymer ratio of 30/70 was used to coat poly(methyl methacrylate) sheeting as in Example XV to give a clear coating having good to excellent scratch resistance.

In contrast to the preceding examples, if no hydroxyl groups are present in the polymer, the coating material has poor scratch resistance and either does not adhere to the substrate or has other properties which make it inoperable. For example, tetrafluoroethylene copolymers with 2-methoxyethyl vinyl ether gave soft coatings which were hazy and crazed. With methyl vinyl ether the copolymer was incompatible with the polysilicic acid solution. In these copolymers there was approximately a molar ratio of tetrafluoroethylene to other monomer of 1 to 1.

The copolymer used in this invention is readily prepared by conventional methods (see, for example, Hanford et al., U.S. Patent No. 2,468,664) as illustrated by the following: A 2-gallon reactor was charged with 5500 cc. of t-butyl alcohol, 26 g. of anhydrous potassium carbonate, 330 g. of 4-hydroxybutyl vinyl ether, 0.9 g. of azodiisobutronitrile, and 390 g. of tetrafluoroethylene and heated with stirring to 65° C. for 3.5 hours during which time the pressure fell from an initial value of about 140 p.s.i. to 55 p.s.i. The copolymer was obtained as a viscous clear, colorless solution in the t-butyl alcohol having 11.0% solids content. A portion of the polymer was isolated by dilution with distilled water and after further washing with water and air drying there was obtained a white solid copolymer having inherent viscosity (0.1% in dioxane at 25° C.) of 0.70, and a fluorine content of 35.78% (calcd. for 1:1 copolymer, 35.2%). The copolymer was soluble in methanol.

The preparation of copolymers of other ω-hydroxyalkyl vinyl ethers with fluoroolefins such as tetrafluoroethylene are carried out in a similar manner. Terpolymers, such as in Examples III and VII, are prepared by the same general procedure except the charge consists of substantially equivalent amounts of different vinyl ethers.

The following table shows tetrafluoroethylene copolymers prepared with other monomers, and where determined the viscosity (inherent at 0.1% in acetone or dioxane) and fluorine content of the copolymers.

| Comonomer(s) | Inherent viscosity | Percent F |
|---|---|---|
| 2-hydroxyethyl vinyl ether | [1] 0.61 | 39.68 |
| 2-hydroxyethyl vinyl ether with 4-hydroxybutyl vinyl ether | [2] 0.74 | 38.1 |
| 2-hydroxyethyl vinyl ether with 2-methoxyethyl vinyl ether | [2] 0.5 | 40.3 |
| 3-hydroxypropyl vinyl ether | [1] 0.76 | 36.27 |
| 3-hydroxypropyl vinyl ether with 4-hydroxybutyl vinyl ether | | |
| 5-hydroxypentyl vinyl ether | [1] 0.57 | 33.42 |
| 6-hydroxyhexyl vinyl ether | | |

[1] Acetone  [2] Dioxane

Other fluorine-containing olefinic copolymers are obtained by the same general procedure. For example, when 25 g. of chlorotrifluoroethylene, 17 g. of 4-hydroxybutyl vinyl ether, 250 ml. of t-butyl alcohol, 1 g. of potassium carbonate and 0.04 g. of azodiisobutyronitrile were heated at 65° C. for 8 hours in a closed vessel, there was obtained 37 g. of copolymer after precipitation by addition of water which had 16.57% Cl and 22.91% F.

The ω-hydroxyalkyl vinyl ethers may be prepared by known methods, for example the vinylation of the corresponding glycol with acetylene using an alkaline catalyst such as illustrated as follows:

A 1 l. "Hastelloy"® reactor was charged with 450 g. of 1,4-butanediol and 12 g. of potassium hydroxide pellets, closed, cooled, and evacuated. Acetylene was added and the mixture heated with rocking at 150° C. and approximately 150–200 p.s.i. pressure, repressuring with acetylene as the gas was absorbed. During 10–12 hours approximately 130 g. of acetylene were absorbed. The resulting crude product from four such runs was flash distilled under reduced pressure and refractionated with a spinning band column under reduced pressure. After careful removal of the lower boiling 1,4-butanediol divinyl ether, B.P. ca. 47° C./4.9 mm., there was obtained 1072 g. of colorless liquid 4-hydroxybutyl vinyl ether, B. 66.5° C./3.9 mm.

*Analysis.*—Calcd. for $C_6H_{12}O_2$: C, 61.9; H, 10.4. Found: C, 61.75; H, 10.26.

Using this procedure, 2-hydroxyethyl vinyl ether (B. 71°/50 mm.), 3-hydroxypropyl vinyl ether (B. 72.5°/16 mm.), 5-hydroxypentyl vinyl ether (B. 102°/16 mm.), and 6-hydroxyhexyl vinyl ether (B. 115° C./15 mm.) were prepared.

Additional specific examples of vinyl ethers which are generally obtainable by reaction of acetylene with appropriate polyhydric alcohols as above and are useful for the preparation of silica-containing compositions through use of these copolymers with a single fluoroolefin, or with a mixture of more than one fluoroolefin, include 2,3-dihydroxypropyl vinyl ether,
3-hydroxy-2,2-dimethylpropyl vinyl ether,
2-methyl-2-hydroxymethyl-3-hydroxypropyl vinyl ether,
2-ethyl-2-hydroxymethyl-3-hydroxypropyl vinyl ether,
3-(hydroxymethyl)-5-hydroxypentyl vinyl ether,
2,2-bis(hydroxymethyl)-3-hydroxypropyl vinyl ether,
1-hydroxymethyl-4-vinyloxymethylcyclohexane,
2,2-difluoro-3-hydroxypropyl vinyl ether,
2,2,3,3-tetrafluoro-4-hydroxybutyl vinyl ether,
2-[2-hydroxyethoxxy]ethyl vinyl ether.

The following are specific vinyl ethers which may be used in combination with one or more of the above hydroxyl-containing vinyl ethers in combination with a single fluoroolefin or with a mixture of more than one fluoroolefin to obtain copolymers for silica-containing compositions: methyl vinyl ether, isobutyl vinyl ether, octadecyl vinyl ether, 2-methoxyethyl vinyl ether, 2-[2-methoxyethoxy]ethyl vinyl ether, 2-[methoxymethoxy]ethyl vinyl ether, 2-chloroethyl vinyl ether, 3,3,4,4,5,5,6,6,7,7,8,8,8-tridecafluoro-n-octyl vinyl ether, 2,2,3,3,4,4,5,5-octafluoro-n-pentyl vinyl ether, 2,2,3,3,4,4,4-heptafluorobutyl vinyl ether, 2,2,3,3-tetrafluoropropyl vinyl ether, 1,1,2,2-tetrafluoroethyl vinyl ether, trifluoromethyl vinyl ether and methyl trifluorovinyl ether.

Additional multicomponent copolymers useful for the preparation of the silica-containing compositions can be obtained by copolymerizing one or more polymerizable fluoroolefins with one or more vinyl ethers and an additional comonomer selected such that the resulting polymer contains fluorine and primary alcoholic hydroxyl groups within the ratios as previously specified. Suitable monomers include methyl methacrylate, vinyl acetate, methyl acrylate, vinyl trifluoroacetate, isobutylene, 2,2,3,3,4,4,5,5-octafluoro-n-pentyl methacrylate, 3,3,4,4,5,5,6,6,7,7,8,8,8-tridecafluoro-n-octyl methacrylate, vinyl gylcollate, vinyl hydracrylate, and 2-hydroxyethyl methacrylate.

The fluorine-containing monomers that are particularly useful for copolymerization to give the desired primary hydroxyl-containing polymers can be represented by the formula $CF_2=CXX'$ where X is F or Cl, X′ is H, F, Cl, $R_f$ or $OR_f$ where $R_f$ is a lower perfluoroalkyl, generally of up to 4 carbons and specifically trifluoromethyl, pentafluoroethyl or heptafluoropropyl as in hexafluoropropene and similar compounds. In addition, part of the above polyfluoroethylenic component can be replaced by vinyl fluoride or vinylidene fluoride to give multicomponent fluorine- and primary hydroxyl-containing polymers.

Although copolymers of the above types are especially useful, homopolymers such as of 2,2,3,3-tetrafluoro-4-hydroxybutyl vinyl ether and ω-hydroxyalkyl perfluorovinyl ethers provide fluorine and primary alcoholic hydroxyls and are useful to give directly polymers for use with silica solutions.

The methods for obtaining suitable polymeric compositions and monomers from which they are derived are well known to monomer and polymer art. In some instances it is preferred that the monomer contain an ester, e.g., acetate, group of a primary alcoholic hydroxyl which can be removed after the polymerization is effected to give hydroxylated polymer. Illustrative of this technique is the polymerization of tetrafluoroethylene with acetoxyethyl vinyl ether by a free radical catalyst followed by hydrolysis and of acetoxyethyl vinyl ether with 3,3,4,4,5,5,6,6,6-nonafluoro-n-hexyl vinyl ether with a Lewis acid followed by hydrolysis of the polymer. Similarly 4-acetoxybutyl isopropenyl ether can be polymerized with tetrafluoroethylene and the resulting copolymer converted to the fluorine- and primary hydroxyl-containing copolymer.

By the above type of procedures the following specific copolymers are available and useful for the preparation of silica-containing compositions: tetrafluoroethylene/10-hydroxydecyl vinyl ether, chlorotrifluoroethylene/8- hydroxyoctyl vinyl ether, tetrafluoroethylene/1,1-difluoroethylene/4 - hydroxybutyl vinyl ether, hexafluoropropene/4-hydroxybutyl vinyl ether, tetrafluoroethylene/3-hydroxy-2,2-dimethylpropyl vinyl ether, mixed chlorotrifluoroethylenetetrafluoroethylene/4 - hydroxybutyl vinyl ether (e.g., in a 0.5–0.5/1 molar ratio), and tetrafluoroethylene/2 - hydroxyethyl vinyl ether/3,3,4,4,5,5,6,6,7,7,8,8,8-tridecafluoro-n-octyl vinyl ether in 0.5/0.1/0.4 molar ratio.

The preceding shows the use of fluorine-containing copolymers of ω-hydroxyalkyl vinyl ethers. These ethers comprise a readily available and preferred class of copolymerizable vinyl compounds having a primary alcohol and can be represented by the general formula

where $n$ is preferably a plural integer, e.g., of up to 10, as in ω-hydroxydecyl vinyl ether. Useful polymers are also obtained when difluoromethylene groups are substituted for all but the two terminal methylene groups. A related type of compounds is those having a plurality of polyoxyethylene groups such as

where $m$ is an integer of generally 1–5.

Accordingly, appropriate monomeric materials are employed to provide a polymer that contains a plurality of fluorine and primary alcoholic hydroxyls. The ratio of fluorine to hydroxyl usually is between 1/1 and 6/1 and is preferably from 2 to 4 fluorines to 1 hydroxyl. The ratio of fluorine to carbon is preferred to be from 1 atom of fluorine to between 1 and 8 carbon atoms and is usually between about 1 fluorine to from between 2 and 4 carbons.

It is important that the fluorine content be in this range to provide a particularly useful combination of low reflectivity, adhesion, toughness, resistance to adverse conditions, checking, etc. In general, the fluorine content in the solid polymer having both fluorine and primary alcoholic hydroxyl is within the range of about 6–65 and preferably 23–41%.

The fluorine-containing polymer can be purified to remove impurities or unreacted monomers by conventional techniques, as desired, before it is mixed with polysilicic acid. Preferably the polymer contains halogen, hydrogen, carbon and oxygen, is free from labile and reactive groups such as thiol or primary amino, and is generally thermally stable to 100° C. or higher.

Solvents useful for the preparation of coating compositions depend on the polymeric materials employed, substrate, and other factors such as evaporation rate, etc. The solvent should boil below 150° C. and preferably below 125° and have appreciable vapor pressure at below 100° C. The solvents are polar in nature and should be compatible with the other ingredients of the solutions in a wide range of proportions. Preferred solvent systems have at least 50% of 1–5 carbon alkanols, e.g., methanol, ethanol, propanols, butanols, 2–15% water and up to about 40% of 1–3 carbon alkanoic acids, e.g., formic, acetic, propionic. Minor amounts of halogenated (chlorine- and/or fluorine-containing) solvents such as trichloroethylene may be present. For coating poly(methyl methacrylate), at least 10% of alkanoic acid should be present.

The polysilicic acid employed with the hydroxyl-containing, fluorine-containing polymers is readily available. For example, ethyl silicate (tetraethyl orthosilicate) and condensed ethyl silicate (40% $SiO_2$) are commercial products. They are soluble in organic solvents and readily hydrolyzed by water to a useful soluble polysilicic acid. By use of varying amounts of water, the exact degree of hydrolysis can be varied. A compatible solvent system is a lower alcohol, particularly ethanol. A general formula for the preparation of the polysilicic acid solutions (15% $SiO_2$) is 100 parts of tetraethyl silicate, 92–X parts of ethanol or similar diluent where X is the amount of water or preferably 0.1 N hydrochloric acid. In general, X is preferably about 22.5 or greater. When X is 18 or less, the hydrolysis of ethyl silicate is insufficient to give a good polysilicic acid for use in this invention unless further hydrolysis is brough about in the coating solution or process. Although more water can be used, e.g., X equals up to 50 or more, such large amounts are generally not necessary and may affect adversely the compatibility with some of the organic polymers to be used. In general, evidence of some ethoxy groups, about one per 5 or 6 Si atoms, due to incomplete hydrolysis or occluded ethanol may be found in the final cured coatings derived from ethyl silicates. Although it is possible to make slight further gains in alkali resistance and flexibility by using polysilicic acids bearing a few R—Si— bonds, where R is methyl or phenyl (for example), this results in lower hardness, scratch resistance and compressive strength of the resultant compositions.

As previously demonstrated, the amount of hydroxyl- and fluorine-containing polymeric material and polysilicic acid (calculated as $SiO_2$) are in a 10–90 to 90–10 proportion. Within this range improved and useful compositions are obtainable. For coating on poly(methyl methacrylate) polymer, the proportions should be 20–50 of polysilicic acid to 80–50 of the polymer to give most useful combinations of surface hardness, adhesion and optical quality. Optimum properties, especially alkali resistance and formability, are obtained at about 25–35% polysilicic acid/75–65% fluorinated hydroxylated polymer.

The use of solutions, as indicated above, gives high quality coatings, particularly in relatively thin layers. However, when thick layers of high optical quality are desired, it has been found that leveling agents, flowing agents or stabilizers compatible with the ingredients employed aid in attaining this goal. Selection is necessary for specific systems from surface-active materials available for such purpose. Examples of compositions that have been useful are silicones derived from relatively low molecular weight block copolymers of mixed polyalkylene oxides and dimethyl silane, such as of the type described in French Patent 1,330,956. "Cellosolve"® derivatives are useful as antihaze or antiblushing agents.

There can also be added to the compositions via the coating solutions, for example, conventional crosslinking agents acting on the organic polymer constituents of the invention. Such agents are peroxides, strong acids, aldehydes and metallic driers. In this way, the swellability of the compositions (as a coating, for example) is further reduced and the polysilicic acid constituent therein is rendered even more resistant to any leaching or alkaline attack.

The solutions used in coating are exceptionally stable over a long period of time, particularly if care has been taken to employ relatively pure ingredients and compatible solvents and additives.

The solutions can be applied to the surfaces to be protected by known methods such as flowing, spraying, or dipping, depending on the thickness, properties desired on the substrate, etc. Although substrates of relatively soft plastic sheet materials show considerable improvement after application, the coating composition also can be applied to other materials, including painted surfaces, metals, glass, wood, etc.

The final hard coating results from removal of solvent and volatile materials. This can be accomplished by air drying or by the use of heat as in an oven. Higher temperatures which do not cause substantial changes in the shape of the substrate facilitate removal of solvent and possible reaction of the polysilicic acid and hydroxylated polymer to form hard cured surface coating inert to moisture, soaps, and organic liquids. Where very close tolerances are required in the finished part, such as in an optical lens, the dried coated part or even the cured tooled part can be subjected to pressure in a die. Thick coatings may be subjected to grinding and polishing to achieve optical precision.

Although thin coatings (0.1$\mu$) can be employed, thicker coatings, e.g., 2.8$\mu$ and even up to 20$\mu$, are particularly useful to give greater resistance to coarse abrasives than thiner coatings. Heretofore, it has been difficult to obtain thick coatings of the good resistance to cracking during weathering and the good optical quality shown by the examples. With the coatings of this invention, even thicker, adherent layers that do not crack during baking are readily available, particularly with low silica content and higher concentration of fluorine- and hydroxyl-containing polymer.

In general, the preferred polysilicic acid/$\omega$-hydroxyaliphatic vinyl ether-polyfluoroolefin copolymer compositions, such as 30% $SiO_2$/70% 4-hydroxybutyl vinyl ethertetrafluoroethylene, can be applied to substrates, e.g., thermoplastic poly(methyl methacrylate), in layers at least up to 15–17 microns thick and can be thoroughly cured by baking in air at 90–180° C. for a few minutes to an hour without cracking due to shrinkage stresses on baking. Such coatings are very resistant to number 0 steel wool and are difficultly marred by calcite (Mohs' hardness of 3), about equal in hardness to apatite (Mohs' hardness of 4), but can be scratched by fluorite (Mohs' hardness of 5). In treating fibers, textiles, and thin films with the compositions of this invention, to improve surface properties without undue thickening or stiffening of the substrates, coatings of 1$\mu$ and less can be applied.

The compositions of this invention furnish insoluble, inert, abrasion-resistant, corrosion-resistant finishes that are also useful in changing the surface frictional, electrical, gas permeability, liquid and ionic diffusional properties and the optical properties (refractive index) of mechanical, electrical, optical, osmotic, filtration or other devices or essential parts thereof as well as the properties of leather, fibers, fur and textiles. By choice of solvent and component polymers, application conditions and pretreatments (including prime-coating) of the substrates, they can be adhered to substantially all solid surfaces. The composition of this invention is therefore useful for coating on wood, metals, glass, and relatively dimensionally stable synthetic organic polymeric materials in sheet or film form such as poly(methyl methacrylate), polyesters (including objects having fiber fillers), polyamides, polyimides, copolymers such as of polyvinyl fluoride, acrylonitrile/butadiene/styrene, polyvinyl chloride, polystyrene, polyoxymethylene, etc. It can be applied to natural and synthetic fibers or to fibrous products and as coatings in contact with antireflective layers for optical applications. Pigments, metal flakes or dyes and ultraviolet dissipators or absorbers can be present in the coating composition and applied to various objects such as automotive bodies and parts, glass panes, refrigerators, etc. Polymeric materials coated with these new compositions are useful in the fabrication of flat or curved plastic enclosures, such as windows, skylights, windshields, lenses, etc., particularly for transportation equipment. The composition can also be used to give cast objects, including fibers and films, of relatively high stiffness, e.g., by use of untreated polytetrafluoroethylene substrate, in a suitable form such as a film from which the object can be removed. The composition can also be used as an impregnant for porous bearings or in paper, leather, etc., or in laminated sheet materials.

Since obvious modifications and equivalents in the invention will be evident to those skilled in the chemical arts, we propose to be bound solely by the appended claims.

The embodiments of the invention in which an exclusive property or privilege is claimed are defined as follows.

We claim:
1. A complex comprising about 10–90 percent by weight of polysilicic acid, calculated as silica, and about 90–10 percent of a preformed organic copolymer containing 6–65 percent by weight of fluorine and a plurality of primary alcoholic groups, the molar ratio of alcoholic hydroxyl to fluorine being in the range of from 1/1 to 1/22 and the molar ratio of fluorine to carbon being in the range of from 1/17 to 1.93/1, said preformed copolymer being a copolymer of at least one polymerizable fluoroolefin of the formula $CF_2=CXX'$ wherein X is F or Cl and X' is H, F, Cl, $R_f$ or $OR_f$, $R_f$ being lower perfluoroalkyl, with at least one omega-hydroxy aliphatic vinyl ether of 3–13 chain atoms, the overall ratio of fluoroolefin to vinyl ether being about 1:1.

2. A complex of claim 1 containing 20–50 percent of polysilicic acid calculated as silica.

3. A complex of claim 1 containing 25–40 percent of polysilicic acid calculated as silica.

4. A transparent complex of claim 1.

5. A complex of claim 1 carrying a pigment.

6. A composition of matter comprising a major amount of a complex of claim 1 and a minor amount of a pigment or inert filler.

7. A complex of claim 1 wherein the polymerizable fluoroolefin is at least one member of the group consisting of tetrafluoroethylene, chlorotrifluoroethylene and hexafluoropropene.

8. A complex of claim 1 comprising about 10–90 percent by weight of polysilicic acid calculated as silica and about 90–10 percent of a preformed copolymer of tetrafluoroethylene and 2-hydroxyethyl vinyl ether.

9. A complex of claim 1 comprising about 10–90 percent by weight of polysilicic acid calculated as silica and about 90–10 percent of a preformed copolymer of tetrafluoroethylene, 2-hydroxyethyl vinyl ether and 2-methoxyethyl vinyl ether.

10. A complex of claim 1 comprising about 10–90 percent by weight of polysilicic acid calculated as silica and about 90–10 percent of a preformed copolymer of tetrafluoroethylene and 4-hydroxybutyl vinyl ether.

11. A complex of claim 1 comprising about 10–90 percent by weight of polysilicic acid calculated as silica and about 90–10 percent of a preformed copolymer of tetrafluoroethylene and 3-hydroxypropyl vinyl ether.

12. A complex of claim 1 comprising about 10–90 percent by weight of polysilicic acid calculated as silica and about 90–10 percent of a preformed copolymer of tetrafluoroethylene, 4-hydroxybutyl vinyl ether and 2-hydroxyethyl vinyl ether.

13. A complex of claim 1 comprising about 10–90 percent by weight of polysilicic acid calculated as silica and about 90–10 percent of a preformed copolymer of tetrafluoroethylene and 5-hydroxypentyl vinyl ether.

14. A complex of claim 1 comprising about 10–90 percent by weight of polysilicic acid calculated as silica and about 90–10 percent of a preformed copolymer of tetrafluoroethylene and 6-hydroxyhexyl vinyl ether.

15. A complex of claim 1 comprising about 10–90 percent by weight of polysilicic acid calculated as silica and about 90–10 percent of a preformed copolymer of chlorotrifluoroethylene and 4-hydroxybutyl vinyl ether.

16. A coating composition comprising a solution in a compatible solvent of complex-forming material consisting essentially of about 10–90 percent by weight of polysilicic acid, calculated as silica, and about 90–10 percent of a preformed organic copolymer containing 6–65 percent by weight of fluorine and a plurality of primary alcoholic groups, the molar ratio of alcoholic hydroxyl to fluorine being in the range of from 1/1 to 1/22 and the molar ratio of fluorine to carbon being in the range of from 1/17 to 1.93/1, said preformed copolymer being a copolymer of at least one polymerizable fluoroolefin of the formula $CF_2=CXX'$, wherein X is F or Cl and X' is H, F, Cl, $R_f$ or $OR_f$, $R_f$ being lower perfluoroalkyl, with at least one omega-hydroxy aliphatic vinyl ether of 3–13 chain atoms, the overall ratio of fluoroolefin to vinyl ether being about 1:1, said solution containing about 2–25 percent of complex-forming materials.

17. A coating composition of claim 16 wherein the solution contains additionally a pigment.

18. A coating composition of claim 17 constituting a paint.

19. A coating composition of claim 16 wherein the complex-forming materials contain 20–50 percent of polysilicic acid calculated as silica.

20. A coating composition of claim 16 wherein the complex-forming materials contain 25–40 percent of polysilicic acid calculated as silica.

21. A coating composition of claim 16 wherein the polymerizable fluoroolefin is at least one member of the group consisting of tetrafluoroethylene, chlorotrifluoroethylene and hexafluoropropene.

22. A solid article serving as a substrate carrying bonded thereto a coating formed from a complex of claim 1.

23. An article of claim 22 wherein the coating is 0.5–20 microns thick.

24. Transparent sheets carrying bonded thereto a coating formed from a complex of claim 1.

25. Poly(methyl methacrylate) sheets carrying bonded thereto a coating formed from a complex of claim 1.

26. The process of coating a solid article which comprises contacting the same with a coating composition of claim 15.

27. The process of claim 26 wherein the contacting is accomplished by dipping.

28. The process of claim 26 wherein the contacting is accomplished by spraying.

29. The process of claim 26 followed by the sequential step of removing volatile materials from the coating.

30. The process of claim 29 in which the volatile materials are removed by air drying.

31. The process of claim 29 in which the volatile materials are removed by baking at a temperature of about 90–180° C. for at least 10 minutes.

32. Polyester sheets carrying bonded thereto a coating formed from the complex of claim 1.

References Cited

UNITED STATES PATENTS

| | | | |
|---|---|---|---|
| 2,592,147 | 4/1952 | Ikeda | 260—29.6 |
| 2,906,658 | 9/1959 | Doban | 260—29.6 |
| 3,324,055 | 6/1967 | Marks et al. | |

SAMUEL H. BLECH, *Primary Examiner.*

J. W. SNOW, *Assistant Examiner.*

U.S. Cl. X.R.

260—87.5, 80.75, 827, 41, 33.4; 117—138.8, 161